(12) United States Patent
Jung et al.

(10) Patent No.: US 7,841,050 B2
(45) Date of Patent: Nov. 30, 2010

(54) FOLDER TYPE HINGE DEVICE AND PERSONAL PORTABLE DEVICE USING THE SAME

(75) Inventors: Joo Yon Jung, Seoul (KR); Ki Tae Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 159 days.

(21) Appl. No.: 11/561,009

(22) Filed: Nov. 17, 2006

(65) Prior Publication Data

US 2007/0261202 A1 Nov. 15, 2007

(30) Foreign Application Priority Data

Nov. 17, 2005 (KR) .................. 10-2005-0110445

(51) Int. Cl.
*E05D 11/10* (2006.01)
(52) U.S. Cl. .......................................... 16/330; 16/252
(58) Field of Classification Search ................ 439/467, 439/595, 596, 822; 16/330, 250, 252, 297, 16/378, 382, 387, 388; 455/575.6, 575.3, 455/575.1, 90.3, 566; 379/433.11; 361/680, 361/681, 679.06, 679.07, 679.55, 679.56
See application file for complete search history.

(56) References Cited

U.S. PATENT DOCUMENTS

| | | | | | |
|---|---|---|---|---|---|
| 5,398,378 | A | * | 3/1995 | Lin .............................. | 16/303 |
| 6,091,601 | A | * | 7/2000 | Schlesener et al. .......... | 361/681 |
| 7,100,240 | B2 | * | 9/2006 | Amano ......................... | 16/303 |
| 7,484,268 | B2 | * | 2/2009 | Kim et al. ..................... | 16/330 |
| 2004/0141287 | A1 | * | 7/2004 | Kim et al. .................... | 361/683 |
| 2004/0181909 | A1 | * | 9/2004 | Kawamoto .................... | 16/330 |
| 2004/0212955 | A1 | * | 10/2004 | Hsieh ........................... | 361/681 |
| 2005/0055807 | A1 | * | 3/2005 | Maatta et al. ................. | 16/366 |
| 2005/0235459 | A1 | * | 10/2005 | Amano ......................... | 16/330 |
| 2006/0005356 | A1 | * | 1/2006 | Amano et al. ................. | 16/341 |
| 2006/0053591 | A1 | * | 3/2006 | Ibaraki et al. ................. | 16/367 |
| 2006/0200941 | A1 | * | 9/2006 | Kim et al. ..................... | 16/221 |
| 2006/0200942 | A1 | * | 9/2006 | Zheng .......................... | 16/221 |
| 2006/0250761 | A1 | * | 11/2006 | Tsai et al. .................... | 361/681 |
| 2006/0285681 | A1 | * | 12/2006 | Hsieh .................... | 379/433.13 |
| 2008/0020812 | A1 | * | 1/2008 | Kobayashi et al. ....... | 455/575.3 |

FOREIGN PATENT DOCUMENTS

| | | |
|---|---|---|
| JP | 2002-359678 | 12/2002 |
| JP | 2004-056320 | 2/2004 |
| JP | 2005-006096 | 1/2005 |
| JP | 2005-236396 | 9/2005 |

* cited by examiner

*Primary Examiner*—Victor Batson
*Assistant Examiner*—Emily M Morgan
(74) *Attorney, Agent, or Firm*—H.C. Park & Associates, PLC

(57) ABSTRACT

A folder type personal portable device comprises a main part including a first hinge case having a hollow shape formed at one side of a top; a folder part including a second hinge case having a hollow shape formed on an opposite side of the top to correspond to the first hinge case; a first hinge part including a clamp piece disposed inside the first hinge case and a first T-shaped clamp flange formed in a single body with the clamp piece and fixed to the main part in a single body; a second hinge part including a rotation boss disposed inside the second hinge case and a second T-shaped clamp flange formed in a single body with the rotation boss and fixed to the folder part in a single body; and a hinge connection axis having one end fixed to the clamp piece.

9 Claims, 9 Drawing Sheets

FOLDER TYPE HINGE DEVICE AND PERSONAL PORTABLE DEVICE USING THE SAME

CROSS-REFERENCE TO RELATED APPLICATION

This application claims the benefit of Korean Patent Application No. 10-2005-0110445, filed on Nov. 17, 2005, in the Korean Intellectual Property Office, the disclosure of which is incorporated herein in its entity by reference.

BACKGROUND OF THE INVENTION

1. Field of the Invention

The present invention relates to a personal portable device, and more particularly, to a personal portable device having a folder type hinge structure.

2. Discussion of the Background

Generally, a personal portable device may be one of a flip type, a sliding type, a swing type, and a folder type depending on its appearance and driving mode.

In the flip type, a display unit such as a liquid crystal display (LCD) and a key input unit are formed in a single body and the key input unit is protected by using a cover connected to a lower end by a hinge.

In a personal portable device of the sliding type, two sliding parts are mutually overlapping, and a display unit and a key input unit are disposed in the sliding parts to face the same direction. Generally, in the personal portable device of the sliding type, a covered display unit or key input unit of the rear side may be exposed by sliding a front sliding part.

In a personal portable device of the swing type, two main bodies of a terminal are disposed to be opposite to each other and one of the two main bodies is parallel to the other main body while rotating 180 degrees. The described type designates a swing type personal portable device and a position of each of the main bodies of the terminal may be designated, thereby making this type currently popular.

Finally, in the folder type, two folder parts are connected to each other by a hinge and may be opened and closed, and a main display unit and a key input unit are formed on surfaces opposite to each other. In a personal portable device of the folder type, a display unit and a key input unit may be protected by closing the two folder parts, and operations of answering a call or inputting by using keys may be performed by opening the folder parts.

Figure 1:
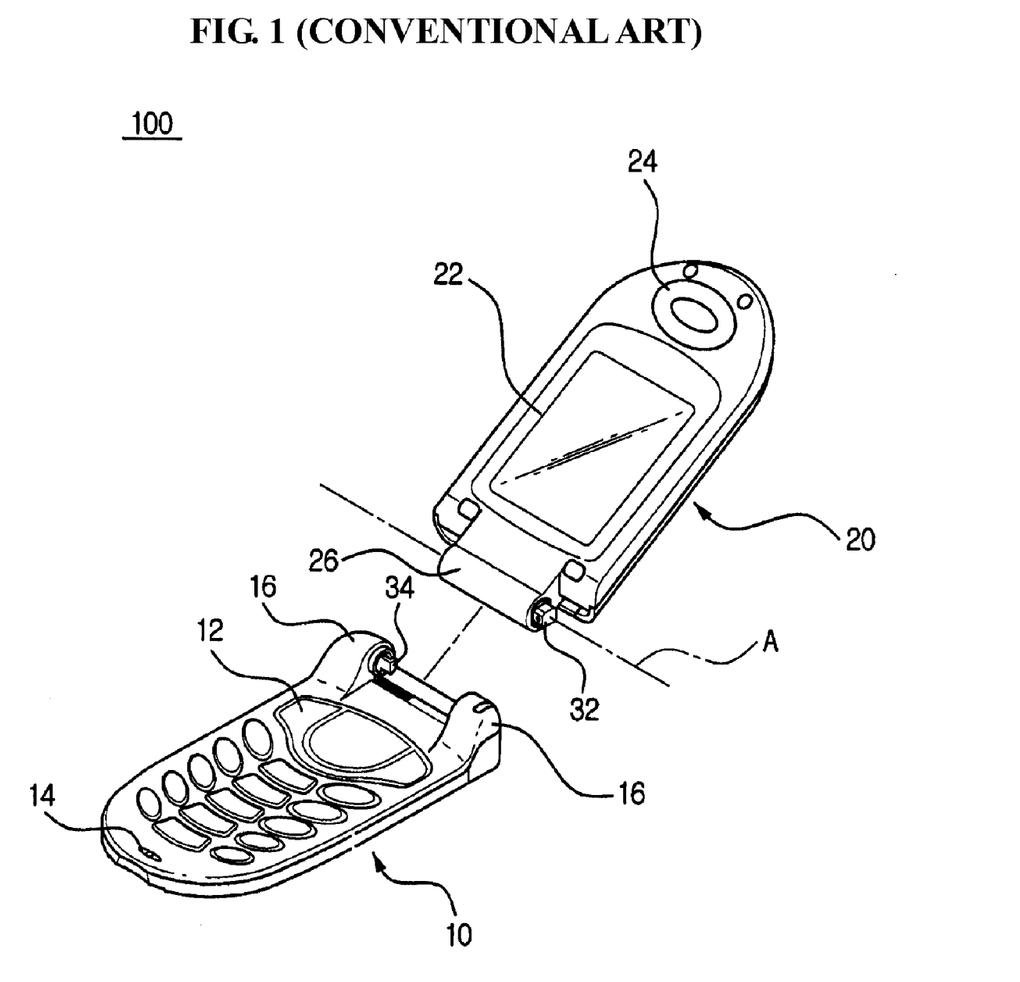
FIG. 1 and FIG. 2 are perspective views illustrating a conventional folder type portable device.

FIG. 1 is a perspective view illustrating a hinge structure of a conventional folder type portable device.

Referring to FIG. 1, the conventional folder type portable device includes a main part 10 and a folder part 20. Both parts are rotatably connected to each other by a hinge member. The main part 10 includes a key input unit 12, a microphone 14, an inner circuit (not shown), and a battery (not shown). The folder part 20 includes an LCD 22 and a receiver 24.

Also, a first hinge unit 16 is formed at both sides of the top of the main part 10 to receive the hinge member, and a second hinge unit 26 is formed at the center of the bottom of the folder part 20 to correspond to the first hinge unit 16.

As shown, the hinge member includes an elastic hinge unit 32 mounted at one side of the second hinge unit 26 and a hinge dummy 34 mounted in the first hinge unit 16 at an opposite side of the elastic hinge unit 32. The elastic hinge unit 32 includes a clamp protrusion, a first cam, a second cam, and a spring, wherein these parts of the elastic hinge unit 32 are arranged in the second hinge unit 26 in a row. The hinge dummy 34 is disposed at an opposite side of the elastic hinge unit 32 to stably fix the main part 10 and the folder part 20. Also, although the hinge dummy 34 is not shown to include a cam or a spring, the hinge dummy 34 may include a cam and a spring as necessary.

Figure 2:
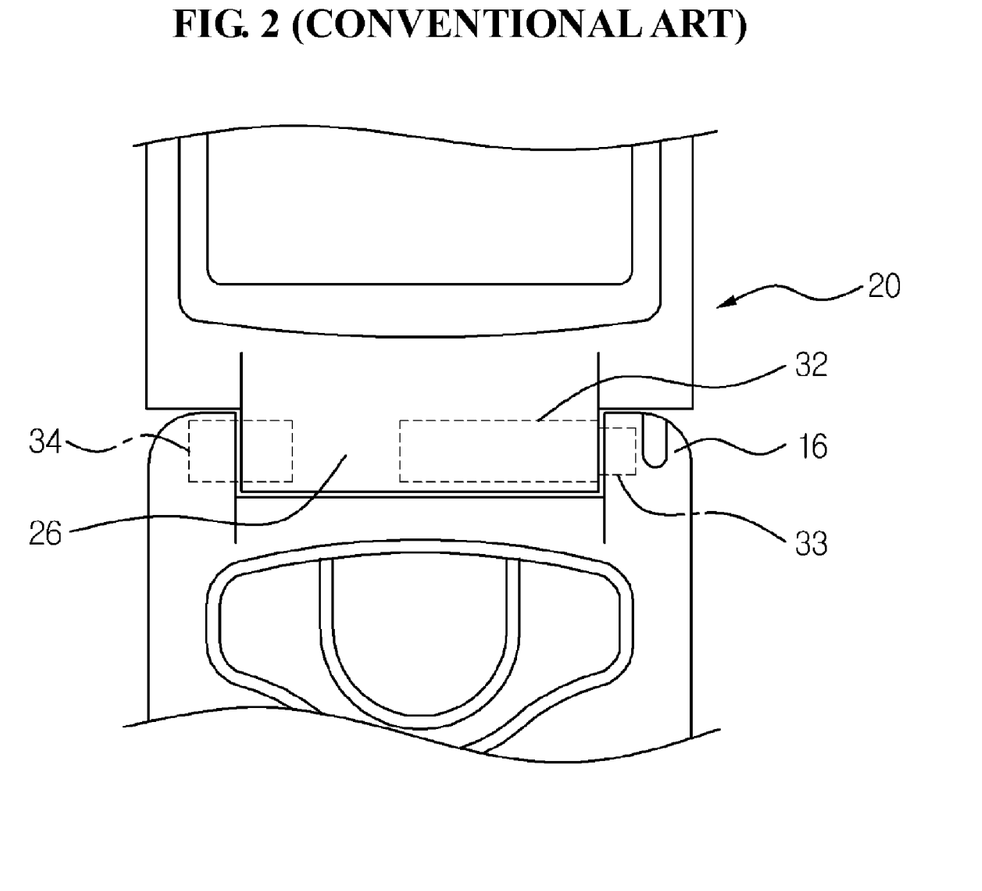

FIG. 2 is a partial enlarged view illustrating the hinge structure of the conventional folder type portable device.

Referring to FIG. 2, the elastic hinge unit 32 in the conventional folder type portable device includes a clamp protrusion 33 protruded toward the side into the first hinge unit 16, wherein the clamp protrusion 33 is fixably inserted into the adjacent first hinge unit 16 to serve as a rotational axis. However, since the clamp protrusion 33 may be small, hinge units connected thereto may swing in a direction other than the rotational axis, thereby causing unstable rotation. Therefore, the hinge structure between the main part 10 and the folder part 20 in the conventional portable device has a structural characteristic in which the main part 10 and the folder part 20 are supported at both sides of the first hinge unit 16 for receiving the hinge member. If either side of the first hinge unit 16 for receiving the hinge member is unsupported, a stable structure may not be obtained. In this case, the elastic hinge unit 32 and the hinge dummy 34 may be used at both sides of the first hinge unit 16 for receiving the hinge member. Alternatively, the elastic hinge unit 32 may be used at both sides of the first hinge unit 16 for receiving the hinge member.

In the conventional folder type portable device, the main part 10 is connected at both sides of the folder part 20 to rotate both ends around the rotational axis. Therefore, since a space for the hinge is relatively large, space applicability for other utility parts is very low and restricted in the portable device. By the above-mentioned problems, it is very difficult to reduce a size of the portable device.

SUMMARY OF THE INVENTION

To solve the described problems, the present invention provides a hinge device and a personal portable device, in which a stable hinge structure connected by a single rotational axis is provided to form an electrical path of a flexible circuit board.

The present invention also provides a personal portable device, in which a main part and a folder part are stably rotated to enable a rotational axis support structure and a maximum space in a hinge structure can be obtained.

The present invention also provides a personal portable device, in which a main part and a folder part are prevented from being detached from each other.

According to an aspect of the present invention, there is provided a folder type personal portable device comprising: a main part including a first hinge case having a hollow shape formed at one side of a top; a folder part including a second hinge case having a hollow shape formed on an opposite side of the top to correspond to the first hinge case; a first hinge part including a clamp piece disposed inside the first hinge case and a first T-shaped clamp flange formed in a single body with the clamp piece and fixed to the main part in a single body; a second hinge part including a rotation boss disposed inside the second hinge case and a second T-shaped clamp flange formed in a single body with the rotation boss and fixed to the folder part in a single body; and a hinge connection axis having one end fixed to the clamp piece and an opposite end inscribed in the rotation boss, and serving as a rotation axis of the second hinge part.

In a conventional folder type portable device, since a folder part is connected to a main part using both ends as a rotational axis, a portion occupied by a hinge is considerably large, whereby space utility of the portable device is reduced in relation to additionally mounting additional parts. To solve this problem, a main part and a folder part might be connected to each other by a single rotational axis, however, when the two parts are connected merely by a conventional axis member, a hinge structure for connecting the parts is unstable, whereby the folder part may swing in the main part.

However, in a folder type hinge device according to the present invention, since the first and second T-shaped clamp flanges are stably fixed to the main part and the folder part, the folder part can stably be opened and closed without wiggling. Also, since the main part and the folder part are connected to each other by a single axis, a space for additional devices, such as a camera, is provided, thus space utility for additional device increases.

Furthermore, the folder type portable device according to the present invention is provided with first and second ring shaped protrusions respectively formed in the end where the first hinge case adjoins the second hinge case, and may further include a detachment stopper having first and second grooves for receiving the first and second ring shaped protrusions. The detachment stopper serves to prevent the main part and the folder part from being detached from each other so as to prevent the movement of the parts in both directions, thereby obtaining a stable structure.

In the present invention, a personal portable device may be used as a commonly known concept of a terminal which is a portable electrical/electronic device such as a Personal Digital Assistant (PDA), a smart phone, a handheld PC, a mobile phone, and an MP3 player, may include a Code Division Multiple Access (CDMA) module, a Bluetooth module, an infrared communication module (IrDA), a wired or wireless local area network (LAN) card, and has predetermined operation ability by including a predetermined microprocessor executing multimedia playback functionality.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE ILLUSTRATED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
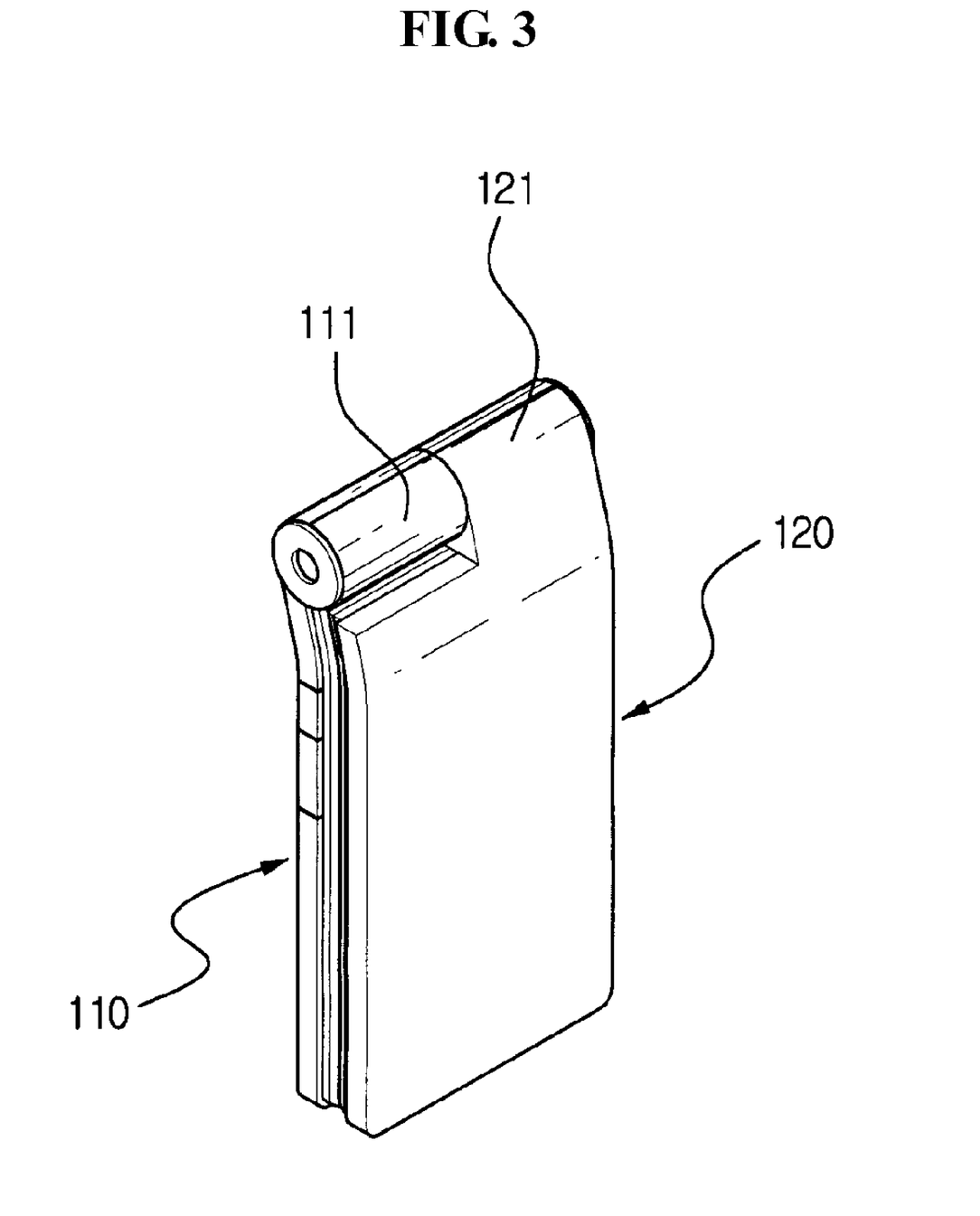
FIG. 3 is a perspective view illustrating a personal portable device according to an embodiment of the present invention.
Figure 4:
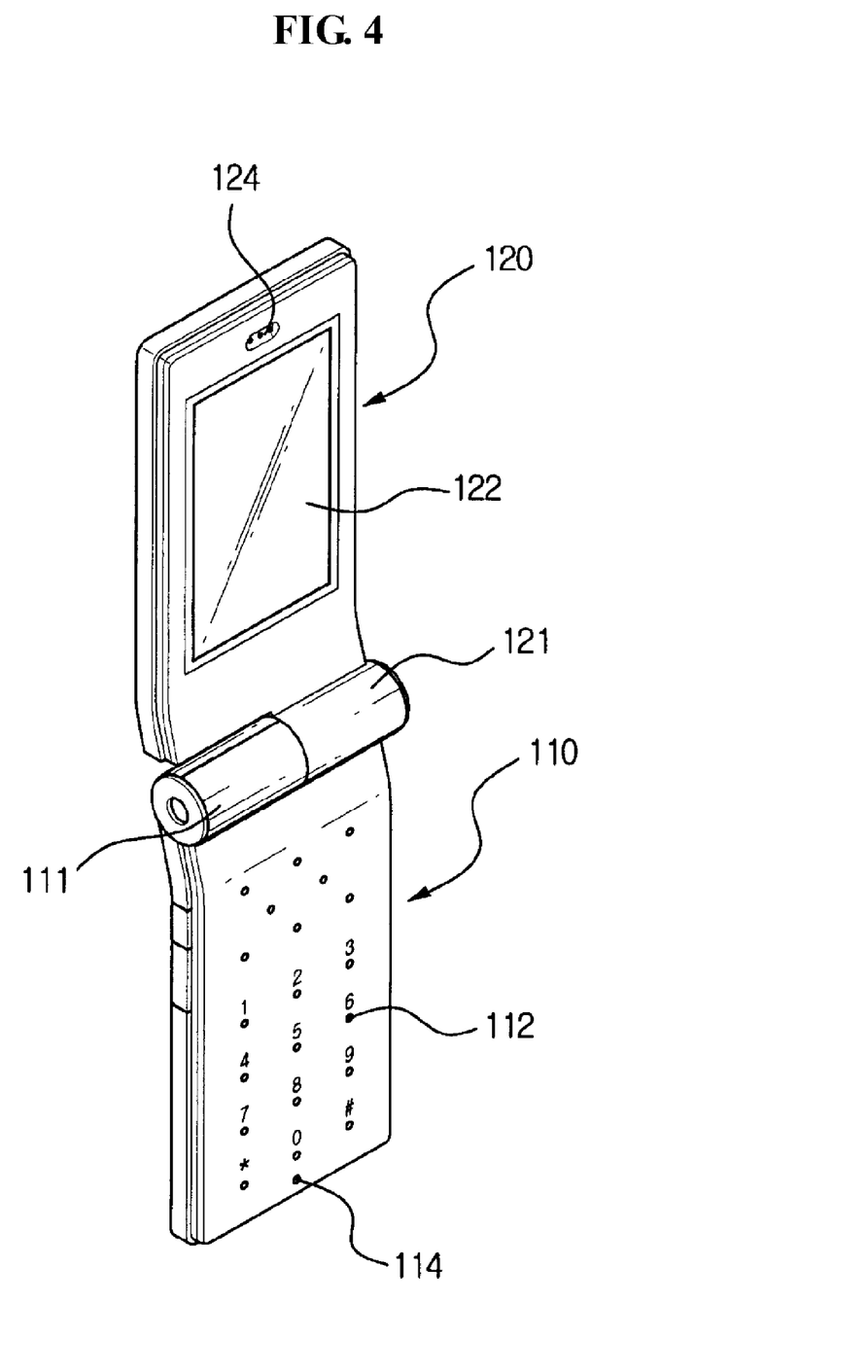
FIG. 4 is a perspective view illustrating a personal portable device of FIG. 3 in an opened state.
Figure 5:
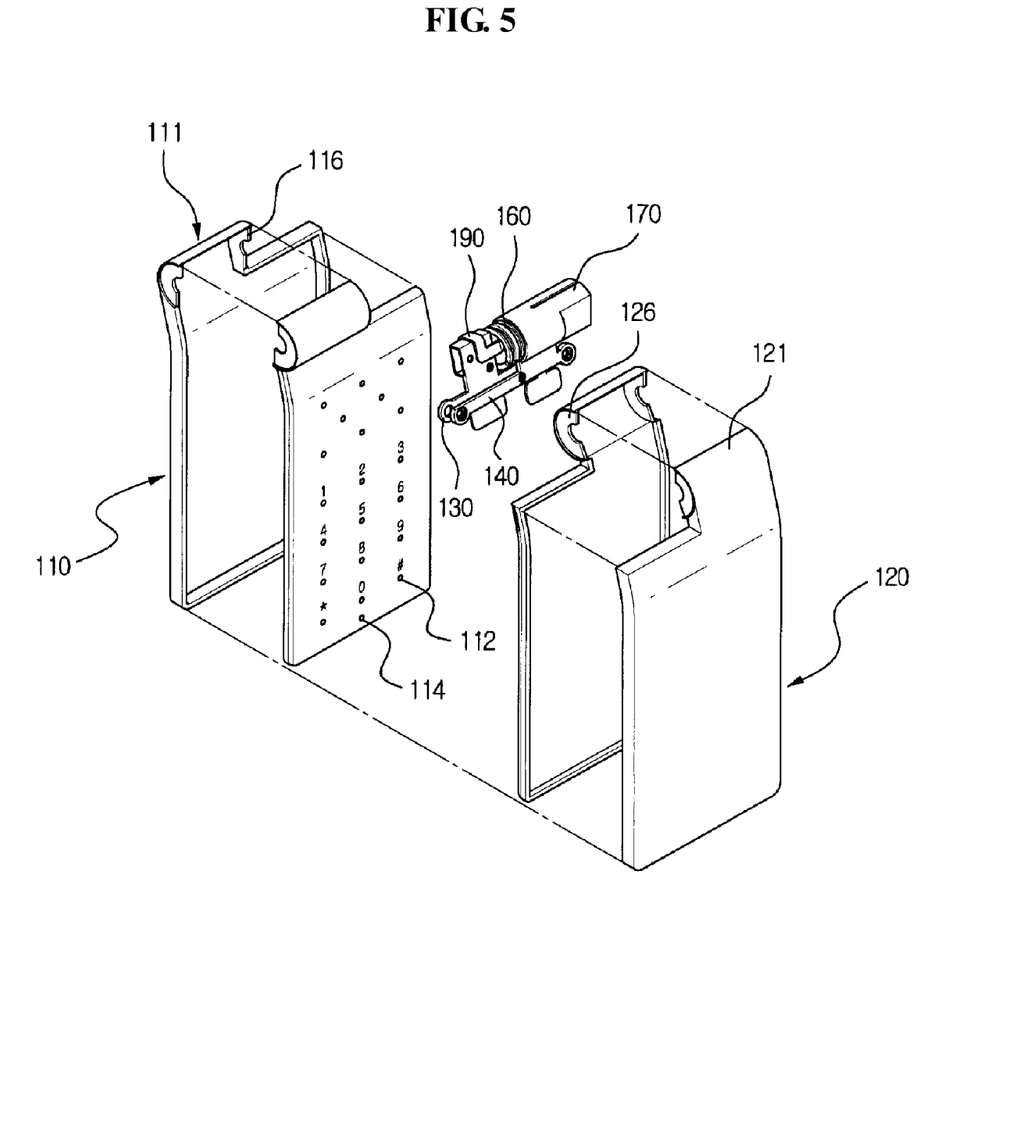
FIG. 5 is an exploded perspective view illustrating a personal portable device of FIG. 3.
Figure 6:
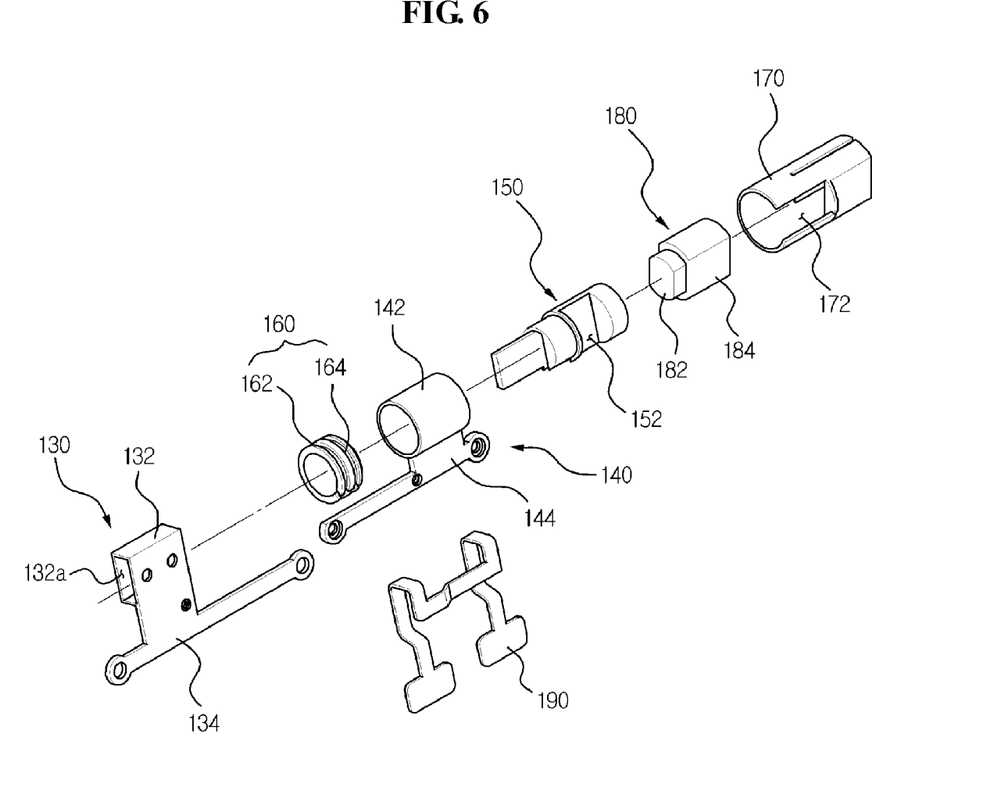
FIG. 6 is an exploded perspective view illustrating a hinge device of a personal portable device according to an embodiment of the present invention.

FIG. 3 is a perspective view illustrating a personal portable device according to an embodiment of the present invention, FIG. 4 is a perspective view illustrating a personal portable device of FIG. 3 in an opened state, and FIG. 5 is an exploded perspective view illustrating a personal portable device of FIG. 3. FIG. 6 is an exploded perspective view illustrating a hinge device of a personal portable device according to an embodiment of the present invention.

Referring to FIG. 3, FIG. 4, FIG. 5, and FIG. 6, the personal portable device includes a main part 110, a folder part 120, a first hinge part 130, a second hinge part 140, a hinge connection axis 150, a detachment stopper 160, a hinge cover 170, an elastic hinge unit 180 and a flexible circuit board 190.

Specifically, the main part 110 includes a key input unit 112 and a battery (not shown), and is provided with a communication module and an inner circuit therein. Also, a microphone 114 is provided at a bottom of the main part 110 to telecommunicate with a receiving party. The first hinge part 130 is provided at the top of the main part 110. A first clamp flange 134 of the first hinge part 130 may be longitudinally fixed to the main part 110 in a horizontal axis. The main part 110 includes a first hinge case 111 having a hollow shape at one side of the top, and a clamp piece 132 of the first hinge part 130 is disposed inside the first hinge case 111. A module having additional function, such as a camera module, a global positioning system module, and other communication modules, may be mounted in the first hinge case 111.

The folder part 120 includes an LCD 122 and a receiver 124. A second hinge case 121 is provided at the top of the folder part 120 to correspond to the first hinge case 111 of the main part 110. The second hinge part 140 is mounted in the second hinge case 121 so that a rotation boss 142 is disposed therein. A second clamp flange 144 of the second hinge part 140 may longitudinally be fixed into the folder part 120.

Referring more specifically to FIG. 3 and FIG. 4, the main part 110 and the folder part 120 are arranged to mutually overlap in a closed state. If the folder part 120 is unfolded from the main part 110 to use the portable device, the folder part 120 is rotated at a predetermined angle by a hinge device, wherein this state may be referred to as an opened state.

Figure 7:
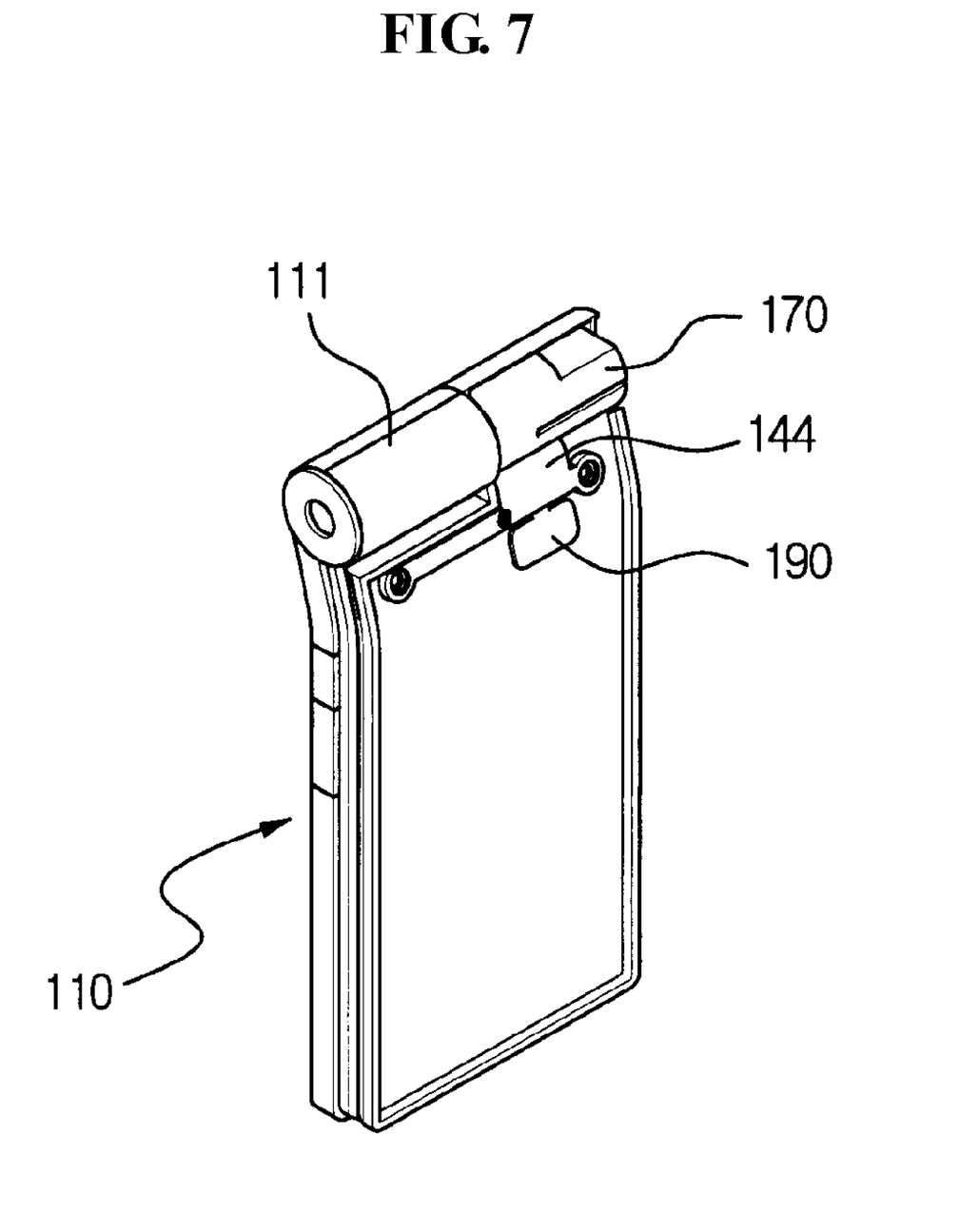
FIG. 7 is a rear view of a folder part, illustrating a mounting position of a second hinge part of FIG. 6.

As described above, FIG. 6 is an exploded perspective view illustrating the hinge device of the personal portable device according to an embodiment of the present invention. FIG. 7 is a rear view of the folder part, illustrating a mounting position of the second hinge part of FIG. 6, and FIG. 8 is a rear view of the main part, illustrating a mounting position of the first hinge part of FIG. 6.

Figure 8:
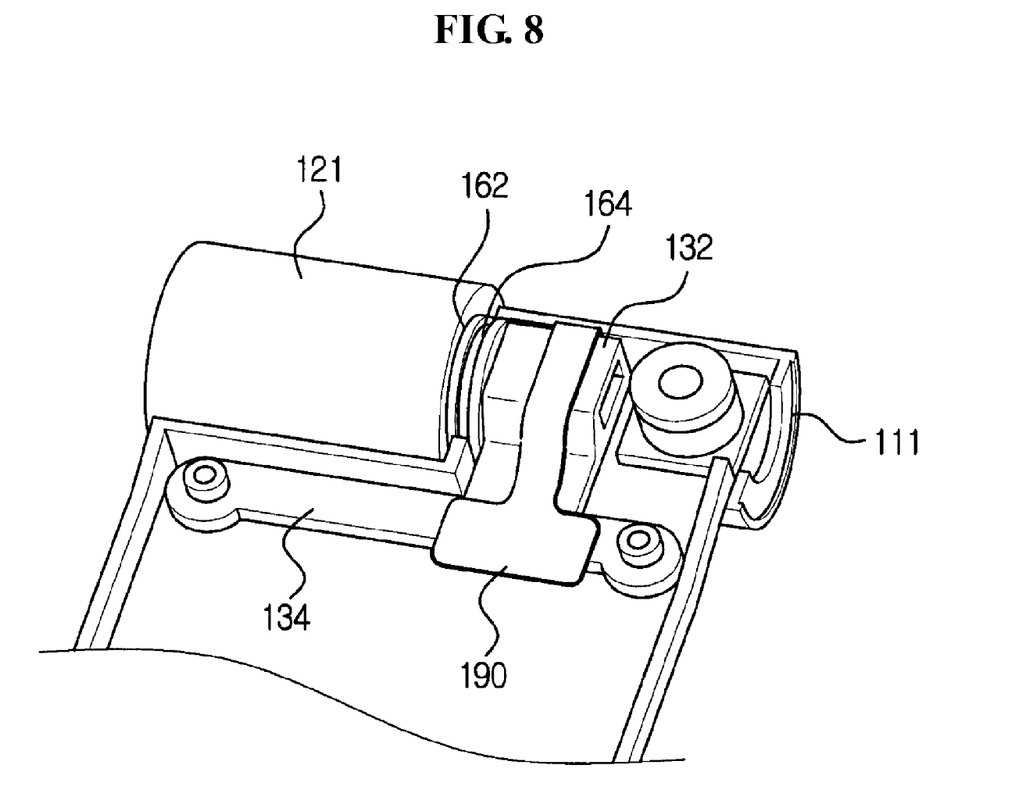
FIG. 8 is a rear view of a main part, illustrating a mounting position of a first hinge part of FIG. 6.

Referring to FIG. 6, FIG. 7, and FIG. 8, the first hinge part 130 is fixed to the main part 110, and is rotatably connected to the second hinge part 140 so that the folder part 120 may be rotated with respect to the main part 110. The first hinge part 130 includes a clamp piece 132 and a first clamp flange 134. The clamp piece 132 is disposed inside the first hinge case 111, and is provided with an inner space 132a at the center. An end of the hinge connection axis 150 is inserted into the inner space 132a to together fix the clamp piece 132 and the hinge connection axis 150 therein. The clamp piece 132 has a hexagonal shape. Alternatively, the clamp piece 132 may be manufactured to have other shapes. The first clamp flange 134 has a T-shape, and its end is provided with the clamp piece 132 in a single body to be connected with the main part 110 in a single body. As shown in FIG. 8, the first clamp flange 134 is longitudinally fixed into the main part 110 in a horizontal axis. Since both ends of the first clamp flange 134 are fixed into the main part 110 at a wide area, the first hinge case 111 and the main part 110 can stably be fixed to each other without extraneous movement even when receiving an external impact.

The second hinge part 140 is fixed to the folder part 120, and is rotatably connected to the first hinge part 130. The second hinge part 140 includes a rotation boss 142 and a second clamp flange 144. The rotation boss 142 is disposed inside the second hinge case 121, and has a hollow cylindrical shape. An opposite end of the hinge connection axis 150 can fixably be inserted into an inner space of the cylindrical rotation boss 142, and the rotation boss 142 can rotatably be connected to the first hinge part 130. The second clamp flange 144 has a T-shape, and its end is formed in a single body with the rotation boss 142 and fixed to the folder part 120 in a single body. As shown in FIG. 7, the second clamp flange 144 is longitudinally mounted in the folder part 120 in a horizontal axis.

The hinge connection axis 150 is mounted to pass through the clamp piece 132 and the rotation boss 142, and an end of the hinge connection axis 150 is fixed to the clamp piece 132. An opposite end of the hinge connection axis 150 is inscribed in an inner surface of the rotation boss 142. The inner space 132a is formed at the center of the clamp piece 132, and one end of the hinge connection axis 150 is formed to have a shape corresponding to the inner space 132a and then inserted into the inner space 132a. The clamp piece 132 and the hinge connection axis 150 are fixed to each other by a screw. Accordingly, since the hinge connection axis 150 is fixed to the clamp piece 132, it does not rotate and rather serves as a rotation axis of the rotation boss 142 inside the rotation boss 142. The hinge connection axis 150 provides a connection path 152 in the rotation boss 142 and the hinge connection axis 150, through which a flexible circuit board 190 passes.

The detachment stopper 160 is disposed between the first hinge part 130 and the second hinge part 140, and serves to prevent the main part 110 and the folder part 120 from being detached from each other in both directions. A first ring shaped protrusion 116 is formed at the end of the main part 110 adjacent to the folder part 120, and a second ring shaped protrusion 126 is formed at the end of the folder part 120 adjacent to the main part 110. A first groove 162 and a second groove 164 are provided outside the detachment stopper 160, wherein the first groove 162 is to be fitted to the first protrusion 116 and the second groove 164 is to be fitted to the second protrusion 126. Accordingly, since the main part 110 and the folder part 120 are fixed to the first groove 162 and the second groove 164 of the detachment stopper 160, they are not detached from each other, thereby obtaining a stable hinge structure.

The hinge cover 170 has a cylindrical shape to be circumscribed around the rotation boss 142, and includes a through hole 172 for passing a connection portion between the rotation boss 142 and the second clamp flange 144. The hinge cover 170 is connected to the end of the elastic hinge unit 180 to transfer a semi-automatic rotational force to the folder part 120. If the folder part 120 is rotated, the hinge cover 170 is together moved by the connection portion. The elastic hinge unit 180 applies a force to the hinge cover 170 so that the elastic force returns the hinge cover 170 to a closed position if partially opened. Also, the elastic hinge unit 180 may apply a force to the hinge cover 170 so that the hinge cover 170 can automatically be opened after a certain distance. However, the invention is not limited hereto, and in another embodiment of the present invention, the hinge cover 170 may be omitted.

Figure 9:
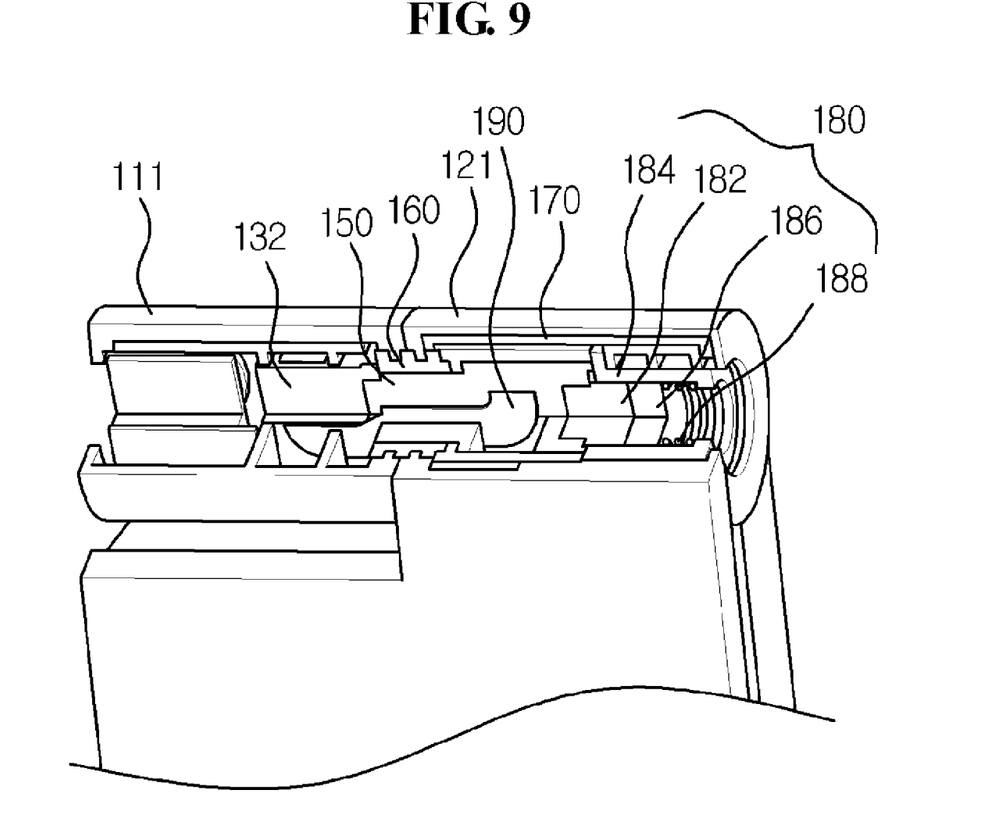
FIG. 9 is a partial sectional view illustrating a hinge device of a personal portable device of FIG. 6.

FIG. 9 is a partial sectional view illustrating the hinge device of the personal portable device according to an embodiment of the present invention.

Referring to FIG. 9, the elastic hinge unit 180 is connected to the hollow shaped hinge connection axis 150 and the hinge cover 170 and thus transfer the elastic force to the main part 110 and the folder part 120 so that the main part 110 and the folder part 120 can be rotated semi-automatically at only a certain angle by two cams. The elastic hinge unit 180 includes a clamp cam 182, a cam housing 184, a motion cam 186, and a spring 188. The clamp cam 182 has one end fixably inserted into the inner space of the hinge connection axis 150. The hinge connection axis 150 is manufactured to have a non-circular shape so that the clamp cam 182 fixed thereto cannot be rotated. The cam housing 184 receives a part of the clamp cam 182 and is mounted in the hinge cover 170. Also, the cam housing 184 has a non-circular shape so that the cam housing 184 cannot rotate in the hinge cover 170. The cam housing 184 may include the motion cam 186 and the spring 188 therein. The motion cam 186 moves along a contact area of the clamp cam 182, and the clamp cam 182 is provided with an inclined surface so that the motion cam 186 moves manually for a certain distance and automatically for a remaining distance. The spring 188 is disposed at the end of the motion cam 186 and can elastically support the motion cam 186. Accordingly, the cam housing 184 is rotated from the clamp cam 182, and transfers the force rotated semi-automatically by the elastic hinge unit 180 to the hinge cover 170 and then to the second hinge part 140 subjected to the hinge cover 170.

The flexible circuit board 190 electrically connects the main part 110 with the folder part 120. A first side of the flexible circuit board 190 is mounted in the inner circuit of the main part 110, and a second side opposite to the first side is mounted in the inner circuit of the folder part 120. At this time, one end of the flexible circuit board 190 is mounted in the inner circuit of the main part 110, the body of the flexible circuit board 190 is longitudinally extended along the first clamp flange 134 of the first hinge part 130, and passes through the connection path 152 provided between the rotation boss 142 and the hinge connection axis 150. The body of the flexible circuit board 190 has a ring shape to pass through an outside of the hinge connection axis 150, passes through the inside of the folder part 120 through the through hole 172, and an opposite end of the flexible circuit board 190 is electrically connected with the inner circuit of the folder part 120. Accordingly, since the electrical path 152 of the flexible circuit board 190 is formed, it does not affect the circuit board when the main part 110 and the folder part 120 are opened and closed. Thus, a coupling defect between the main part 110 and the folder part 120 can be avoided.

In the folder type hinge device according to the present invention, since the first clamp flange 134 and the second clamp flange 144 are stably fixed to the main part 110 and the folder part 120, the folder part 120 can stably be opened and closed without extraneous movement. Also, since the main part 110 and the folder part 120 are connected to each other by a single axis, a space for additional devices, such as a camera, is provided, and thus space utility for the additional device increases.

Furthermore, the folder type personal portable device according to the present invention is provided with the first ring shaped protrusion 116 and the second ring shaped protrusion 126 formed in the end where the first hinge case 111 adjoins the second hinge case 121. The folder type personal portable device according to the present invention may further include the detachment stopper 160 having the first groove 162 and the second groove 164 for receiving the first ring shaped protrusion 116 and the second ring shaped protrusion 126. Accordingly, the detachment stopper 160 serves to prevent the main part 110 and the folder part 120 from being detached from each other so as to prevent a movement of the parts in a direction other than the rotational direction for opening and closing the folder part 120, thereby obtaining a stable structure.

As described above, with the folder type personal portable device according to the present invention, since the first clamp flange 134 and the second clamp flange 144 are stably fixed to the main part 110 and the folder part 120, respectively, the folder part 120 can stably be opened and closed without extraneous movement. Also, since the single axis support type hinge structure is configured such that the main part 110 and the folder part 120 are connected to each other by a single axis, the portable device can be manufactured with a unique design and space utility for additional devices, such as a camera module, can be increased.

Furthermore, in the folder type personal portable device according to the present invention, the detachment stopper 160 serves to prevent the main part 110 and the folder part 120 from being detached from each other so as to prevent a movement of the parts in a direction other than the rotational direction for opening and closing the folder part 120, thereby obtaining a stable structure. Moreover, since the hinge device is provided with the elastic hinge unit to semi-automatically open and close the folder part 120, the user can more conveniently open and close the portable device.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A folder type personal portable device, comprising:
a main part comprising a first hinge case having a hollow shape arranged at a first side of a top of the main part;
a folder part comprising a second hinge case having a hollow shape arranged on a second side of the top of the main part to correspond to the first hinge case, the second side arranged opposite to the first side, the second hinge case and the first hinge case arranged along a single axis of rotation;
a first hinge part comprising a clamp piece disposed inside the first hinge case and a first clamp flange formed in a single body with the clamp piece and fixed to the main part;
a second hinge part comprising a rotation boss disposed inside the second hinge case and a second clamp flange formed in a single body with the rotation boss and fixed to the folder part; and
a hinge connection axle having one end fixed to the clamp piece and an opposite end inserted in the rotation boss, the hinge connection axle serving as a rotation axis of the second hinge part.

2. The folder type personal portable device of claim 1, further comprising:
a first ring shaped protrusion arranged in the first hinge case and a second ring shaped protrusion arranged in the second hinge case, both protrusions in a region adjoining the first hinge case and the second hinge case; and
a detachment stopper comprising a first groove receiving the first ring shaped protrusion and a second groove receiving the second ring shaped protrusion.

3. A folder type personal portable device, comprising:
a main part comprising a first hinge case having a hollow shape disposed at a first side of a top of the main part;
a folder part comprising a second hinge case having a hollow shape disposed at a second side of the top opposite to the first side to correspond to the first hinge case;
a first hinge part comprising a clamp piece disposed inside the first hinge case and a first clamp flange formed in a single body with the clamp piece and fixed to the main part;
a second hinge part comprising a rotation boss disposed inside the second hinge case and a second clamp flange formed in a single body with the rotation boss and fixed to the folder part; and
a hinge connection axle having one end fixed to the clamp piece and an opposite end inserted in the rotation boss, the hinge connection axle serving as a rotation axis of the second hinge part,
wherein the hinge connection axle has a hollow area, and further comprises a clamp cam having one end arranged in the hollow area of the hinge connection axle, a cam housing received in a hinge cover, a motion cam disposed inside the cam housing, to rotate at a predetermined angle with respect to a contact area of the clamp piece, and a spring to support the motion cam elastically; and
the hinge cover formed in a cylindrical shape and receiving the rotation boss and the cam housing, the hinge cover including a through hole to pass a wired connection between the rotation boss and the second clamp flange.

4. The folder type personal portable device of claim 1, wherein the clamp piece comprises an inner space at the center, one end of the hinge connection axle is arranged to correspond to the inner space and inserted into the inner space, and the clamp piece and the hinge connection axle are fixed to each other.

5. The folder type personal portable device of claim 1, further comprising:
a flexible circuit board electrically connecting the main part with the folder part,
wherein the hinge connection axle is provided with a connection path for passing the flexible circuit board from the main part to the folder part.

6. A folder type hinge device connecting a main part with a folder part, comprising:
A main part comprising a first hinge case having a hollow shape disposed at a first side of a top of the main part;
a folder part comprising a second hinge case having a hollow shape arranged at an opposite side of the top of the main part to correspond to the first hinge case;
a first hinge part comprising a clamp piece disposed inside the first hinge case and a first clamp flange formed in a single body with the clamp piece and fixed to the main part, the second hinge case and the first hinge case arranged along a single axis of rotation;
a second hinge part comprising a rotation boss disposed inside the second hinge case and a second clamp flange formed in a single body with the rotation boss and fixed to the folder part; and
a hinge connection axle having one end fixed to the clamp piece and the other end inserted in the rotation boss, the hinge connection axle to serve as a rotation axis of the second hinge part.

7. The folder type hinge device of claim 6, further comprising:
a first ring shaped protrusion arranged in the first hinge case and a second ring shaped protrusion arranged in the second hinge case, both protrusions in a region adjoining the first hinge case and the second hinge case; and a detachment stopper comprising a first groove receiving the first ring shaped protrusion and a second groove receiving the second ring shaped protrusion.

8. The folder type hinge device of claim 6, wherein the hinge connection axle has a hollow area, and further comprises a clamp cam having one end arranged in the hollow area of the hinge connection axle, a cam received in a hinge cover, a motion cam disposed inside the cam housing, to rotate at a predetermined angle with respect to a contact area of the clamp piece, and a spring to support the motion cam elastically; and the hinge cover formed in a cylindrical shape to and receiving the rotation boss and the cam housing, the hinge cover including a through hole to pass a wired connection between the rotation boss and the second clamp flange.

9. The folder type hinge device of claim 6, wherein the clamp piece comprises an inner space at a center, one end of the hinge connection axle is arranged to correspond to the inner space and inserted into the inner space, and the clamp piece and the hinge connection axle are fixed to each other by a screw.

* * * * *